United States Patent
Jakupi et al.

(10) Patent No.: US 11,251,602 B2
(45) Date of Patent: Feb. 15, 2022

(54) METHOD FOR LOCATING AN ELECTRICAL ARC FAULT AND ELECTRICAL INSTALLATION PROTECTION DEVICE IMPLEMENTING SUCH A METHOD

(71) Applicant: Schneider Electric Industries SAS, Rueil Malmaison (FR)

(72) Inventors: Andi Jakupi, Marion, IA (US); Hynek Raisigel, Saint Egreve (FR); Costin Vasile, Grenoble (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 384 days.

(21) Appl. No.: 16/029,972

(22) Filed: Jul. 9, 2018

(65) Prior Publication Data
US 2020/0014187 A1    Jan. 9, 2020

(51) Int. Cl.
*H02H 3/38* (2006.01)
(52) U.S. Cl.
CPC .................... *H02H 3/38* (2013.01)
(58) Field of Classification Search
CPC .............................. H02H 3/38–427
See application file for complete search history.

(56) References Cited

U.S. PATENT DOCUMENTS

| | | | |
|---|---|---|---|
| 6,339,525 B1 | 1/2002 | Neiger et al. | |
| 6,987,389 B1 | 1/2006 | Macbeth et al. | |
| 2004/0070281 A1* | 4/2004 | Lineberger | H02J 3/38 307/85 |
| 2011/0273183 A1* | 11/2011 | Shea | G01R 31/12 324/536 |
| 2013/0328398 A1* | 12/2013 | Kanao | H02M 7/53875 307/23 |
| 2016/0079846 A1* | 3/2016 | Drummond | H02M 7/53873 363/56.03 |
| 2016/0241017 A1 | 8/2016 | Schroeder et al. | |
| 2016/0372911 A1* | 12/2016 | Pan | H02H 7/262 |
| 2018/0147497 A1 | 5/2018 | Joo et al. | |

FOREIGN PATENT DOCUMENTS

EP           0740383 B1 *  8/2000   ............. H02H 7/09

* cited by examiner

*Primary Examiner* — Peter M Novak
(74) *Attorney, Agent, or Firm* — Oblon, McClelland, Maier & Neustadt, L.L.P.

(57) ABSTRACT

A method for locating an electrical arc fault upstream or downstream of an electrical protection device connected in series in an electrical circuit between an electrical energy source and an electrical load, the source supplying a supply current to the electrical load. The method includes the measurement of several electrical quantities linked to the supply current, the detection of a simultaneous variation of at least two electrical quantities linked to the supply current, the confirmation of the presence of the arc fault, and the determination of the position of the arc fault upstream or downstream of the protection device. Also, a protection device can implement such a method.

15 Claims, 10 Drawing Sheets

METHOD FOR LOCATING AN ELECTRICAL ARC FAULT AND ELECTRICAL INSTALLATION PROTECTION DEVICE IMPLEMENTING SUCH A METHOD

TECHNICAL FIELD

The invention lies within the field of electrical fault detection in an electrical energy distribution installation. The present invention relates more particularly to a method for determining whether an arc fault is situated upstream or downstream of an electrical protection device. The invention relates also to an electrical protection device implementing such a method.

STATE OF THE ART

An electrical energy distribution installation comprises conductors intended to conduct the electrical energy from one or more sources to one or more loads. Control and protection devices are connected in series with the conductors to control the transfer of the energy from a source to one or more loads and/or to protect the conductors against faults of overload or short-circuit type.

Arc faults may also occur in the installation. An arc fault is created by a failure of an electrical insulation between conductors running at different potentials which leads to a formation of an electrical arc that can be short-lived, periodic or permanent. An arc fault must be eliminated rapidly in order to avoid any potential of fire caused by the electrical arc. For that, a protection device situated upstream of the arc fault must be actuated to disconnect the failing electrical circuit portion.

An electrical arc generates high frequency electromagnetic waves, in a spectrum lying between a few kHz and several tens of MHz and even beyond. For greater clarity, the high frequency characteristic will be mentioned hereinafter in the document in the form of the acronym "HF". The HF electromagnetic waves radiate over all the current conductors which induces HF cunents in the conductors. It is generally the detection of these HF currents which makes it possible to identify the presence of an arc fault. On the other hand, locating the arc fault is difficult since the utility line conductors carry HF currents.

The patent application US 2016/0 241 017 describes a centralized method for protection against arc faults. A comparison between current and voltage signals measured at a circuit breaker and signals measured in each of the various outgoing ways is performed to determine which outgoing path has the fault. Such a method requires a communication means between the circuit breaker and the sensors installed on the various outgoing paths, which increases the cost of the equipment items.

The U.S. Pat. No. 6,339,525 B1 describes an arc detection device capable of differentiating whether the arc fault is situated upstream or downstream of said device. For that, an inductance, connected in series in the electrical circuit, has the function of attenuating the high frequency currents. The device measures the HF current level upstream and downstream of the inductance to deduce therefrom the position of the arc fault. The device can be temporarily disabled in the presence of power line communication energy.

The U.S. Pat. No. 6,987,389 B1 describes a device allowing an upstream/downstream differentiation of an arc fault by the analysis of the polarity of the fluctuations of the voltage and of the current. The relationship of phase variation between current and voltage makes it possible to determine whether the arc fault is situated upstream or downstream of the device. Such a device is however sensitive to the type of load connected downstream of said device.

The present invention aims to differentiate whether the arc fault is situated upstream or downstream of an arc detection device without requiring any communication link between equipment items arranged on different branches of the electrical network being monitored, without requiring the addition of a series inductance on the electrical line being monitored and without requiring a simultaneous measurement of the current and of the voltage at the monitoring point. Also, the present invention is insensitive to the communication signals that may be circulating on the electrical line.

SUMMARY OF THE INVENTION

The subject of the invention is a method for locating an electrical arc fault upstream or downstream of an electrical protection device, said device being connected, upstream, to a first energy supply line linked to, at least, one electrical energy source and, downstream, to a second energy supply line linked to, at least, a first electrical load, the electrical energy source supplying an supply current to the first electrical load, wherein said method comprises the following phases:
  the measurement of several electrical quantities linked to the supply current,
  the confirmation of the presence of the arc fault upstream or downstream of the electrical protection device, and
  the signaling of an arc fault downstream of the electrical protection device, and:
  the transition between the measurement of several electrical quantities and the confirmation of the presence of the arc fault is conditional on the detection of a concomitant variation of at least two electrical quantities linked to the supply current, and
  the transition between the confirmation of the presence of the arc fault and the signaling of a downstream arc fault is conditional on the determination of the position of the arc fault downstream of the electrical protection device.

Advantageously, the measurement of several electrical quantities linked to the supply current comprises the following steps:
  the measurement of a first electrical quantity linked to the supply current in a low frequency band and over a first period,
  the measurement of a second electrical quantity linked to the supply current in the low frequency band and over a second period, and
  the measurement of a third electrical quantity linked to the supply current in a high frequency band and over a third period.

Advantageously, the detection of a concomitant variation of at least two electrical quantities comprises the following steps:
  the calculation of a first deviation between two first electrical quantities evaluated during two consecutive measurement cycles,
  the comparison of the first deviation to a first threshold,
  the comparison of the third electrical quantity to a second threshold,
  the switch to the phase of confirmation of the presence of the arc fault when the first deviation is above the first threshold and when the third electrical quantity is above the second threshold, the return to the phase of measurement of the electrical quantities for a new measurement cycle when the first deviation is below the first threshold or when the third electrical quantity is below the second threshold.

Advantageously, the phase of confirmation of the presence of the arc fault comprises the following steps:

the storage of the measurement of the second electrical quantity in a memory, the zero initialization of a time counter and of an arc fault occurrence counter, the incrementation of the time counter, the measurement of the second electrical quantity, the measurement of the third electrical quantity, the comparison of the value of the third electrical quantity to the second threshold, the incrementation of the arc fault occurrence counter when the value of the third electrical quantity is above the second threshold, the comparison of the arc fault occurrence counter to a predefined occurrence threshold, the comparison of the time counter to a predefined duration, and the switch to the step of location of the arc fault when the arc fault occurrence counter is above the predefined occurrence threshold.

Advantageously, the phase of determination of the position of the arc fault comprises the following steps:

the calculation of an absolute value of a second deviation between the value of the memory and the second electrical quantity, the comparison of the value of the second deviation to a third threshold, and the switch to the downstream fault signaling phase when the value of the second deviation is above the third threshold.

Preferentially, the measurement of the second electrical quantity is an exponential moving average of the measurement of the first electrical quantity.

Preferably, the electrical energy source delivers an alternating current having a fundamental period and the first period lies between a half-fundamental period and a fundamental period.

Preferentially, the second period is greater than or equal to twice the first period.

Advantageously, the first electrical quantity is a measurement of the effective value of the supply current.

Preferably, the second frequency band comprises the frequencies lying between 1 MHz and 40 MHz.

Another subject of the invention is a protection device of an electrical installation comprising:

at least one upstream terminal for connecting the device to an electrical energy source by means of a first current line, at least one downstream terminal for connecting the device to an electrical load by means of a second current line, at least one current switch connected in series by means of at least one current conductor between the upstream terminal and the downstream terminal for breaking or allowing the passage of the supply current, an actuator for actuating the current switch, at least one current sensor arranged to supply a signal representative of the supply current flowing through the current conductor, at least one measurement unit connected to the current sensor to measure the signal representative of the supply current and other electrical quantities linked to the supply current, and a processing unit connected to the measurement unit for receiving the electrical quantities linked to the supply current and for implementing the arc fault detection method described previously.

Advantageously, the processing unit is connected to the actuator to activate said actuator in order to open the current switch when the method switches to the downstream fault signaling phase.

Preferentially, the processing unit implements the method by means of a state machine, each phase of the method corresponding to a state of the state machine.

BRIEF DESCRIPTION OF THE DRAWINGS

Other advantages and features will emerge more clearly from the following description of particular embodiments of the invention, given as nonlimiting examples, and represented in the attached drawings in which.

DETAILED DESCRIPTION OF PREFERRED EMBODIMENTS

Figure 1A:
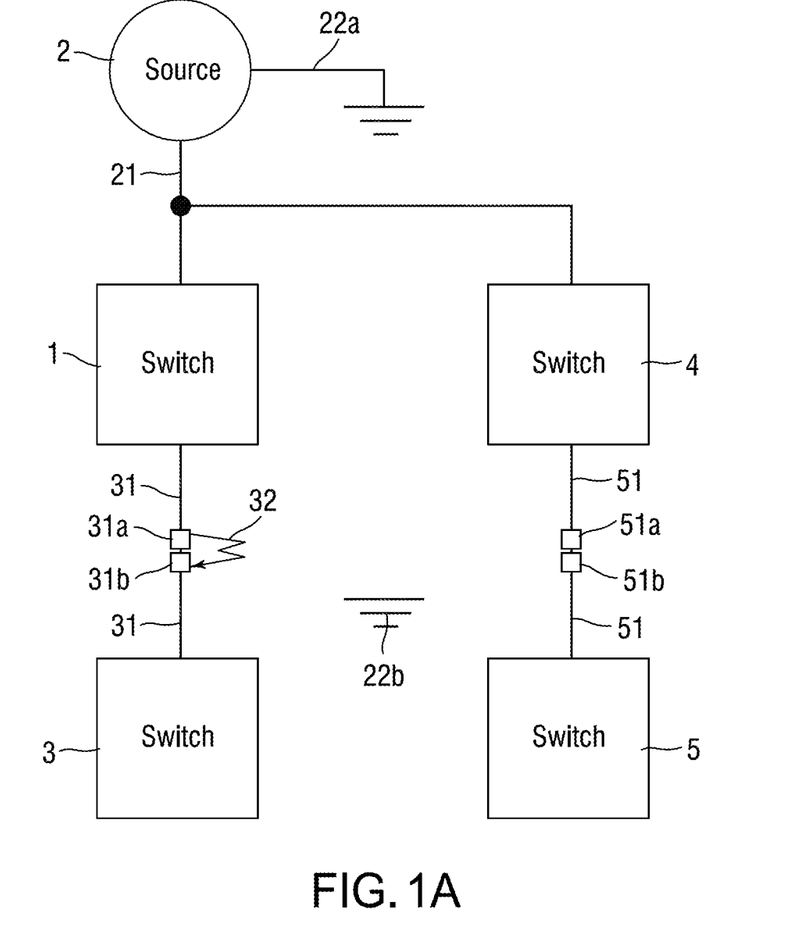
FIGS. 1A and 1B are schematic representations of an electrical installation comprising a source for supplying energy to several electrical loads and representing two different arc fault situations.
Figure 1B:
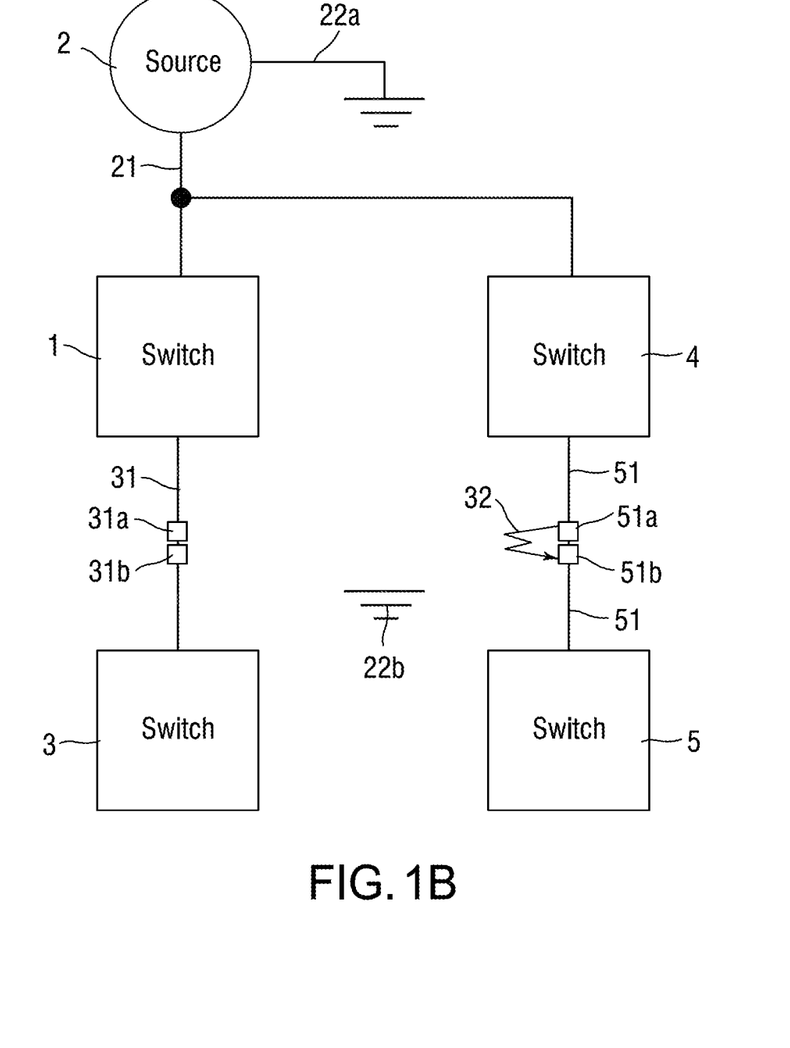

FIGS. 1A and 1B are schematic representations of an electrical installation comprising a source 2 intended to supply electrical energy to several electrical loads 3, 5. The source 2 generally comprises a point of connection to a first ground 22a. A first protection device 1 is connected to the source 2 by means of a first energy supply line 21. A first load 3 is connected to the first protection device 1 by means of a second energy supply line 31. The second energy supply line 31 comprises, for example, a connection comprising a first connection terminal 31a and a second connection terminal 31b connected to one another. The first protection device 1 can, for example, be a circuit breaker, a contactor, a switch or even a disconnector. The first protection device 1 comprises a switch intended to open the second energy supply line 31 in order to isolate the first load 3 from the source 2, i.e. to stop the operation of the first load 3, either because a fault has appeared on the second energy supply line 31 or on the first electrical load 3. A second protection device 4 is also connected to the source 2 by means of the first energy supply line 21. A second electrical load 5 is connected to the second protection device 4 by means of a third energy supply line 51. The second protection device 4 can, for example, be a circuit breaker, a contactor, a switch or even a disconnector. The function of the second protection device 4 is to control or generally protect, like the first protection device 1. Other protection devices can be connected to the first energy supply line 21 to supply energy to other electrical loads.

For example, a first electrical arc fault 32 may appear in series in the second energy supply line 31, between the first connection terminal 31a and the second connection terminal 31b, as represented in FIG. 1A. Such a fault must be eliminated rapidly in order to avoid any potential fire hazard caused by the electrical arc. The first protection device 1 must therefore open the connection between the source 2 and the first load 3. On the other hand, the second protection device 4 must continue to supply energy to the second load 5 in order to guarantee continuity of service. Reciprocally, if a second arc fault 52 appears in series between a third connection terminal 51a and a fourth connection terminal 51b on the third energy supply line 51, as represented in FIG. 1B, the second protection device 4 must open the connection between the source 2 and the second load 5 and the first protection device 1 must continue to supply energy to the first load 3. There can be other types of arc fault, for example an arc fault between the first connection terminal 31a and a second link to a second ground 22b, having the effect of generating a fault current looped back by the first ground 22a.

An electrical arc generates high frequency, or "HF", electromagnetic waves in a very wide spectrum ranging from a few kHz to several tens of MHz and even beyond. The first and second protection devices 1, 4 measure the level of these HF currents to detect the presence of an arc fault, for example according to the method described in the U.S. Pat. No. 6,377,427 B1. However, the HF electromagnetic waves radiate over all the current conductors, which induces HF currents in all of the conductors. Particularly when a second arc fault 52 appears on the third energy supply line 51, HF currents are generated by crosstalk effect on the second energy supply line 31. The first protection device 1 thus has HF currents circulating that are characteristic of an arc fault but, since the arc fault 52 is not located downstream of the first protection device 1, said first protection device 1 must not open the connection between the source 2 and the first load 3.

Figure 2:
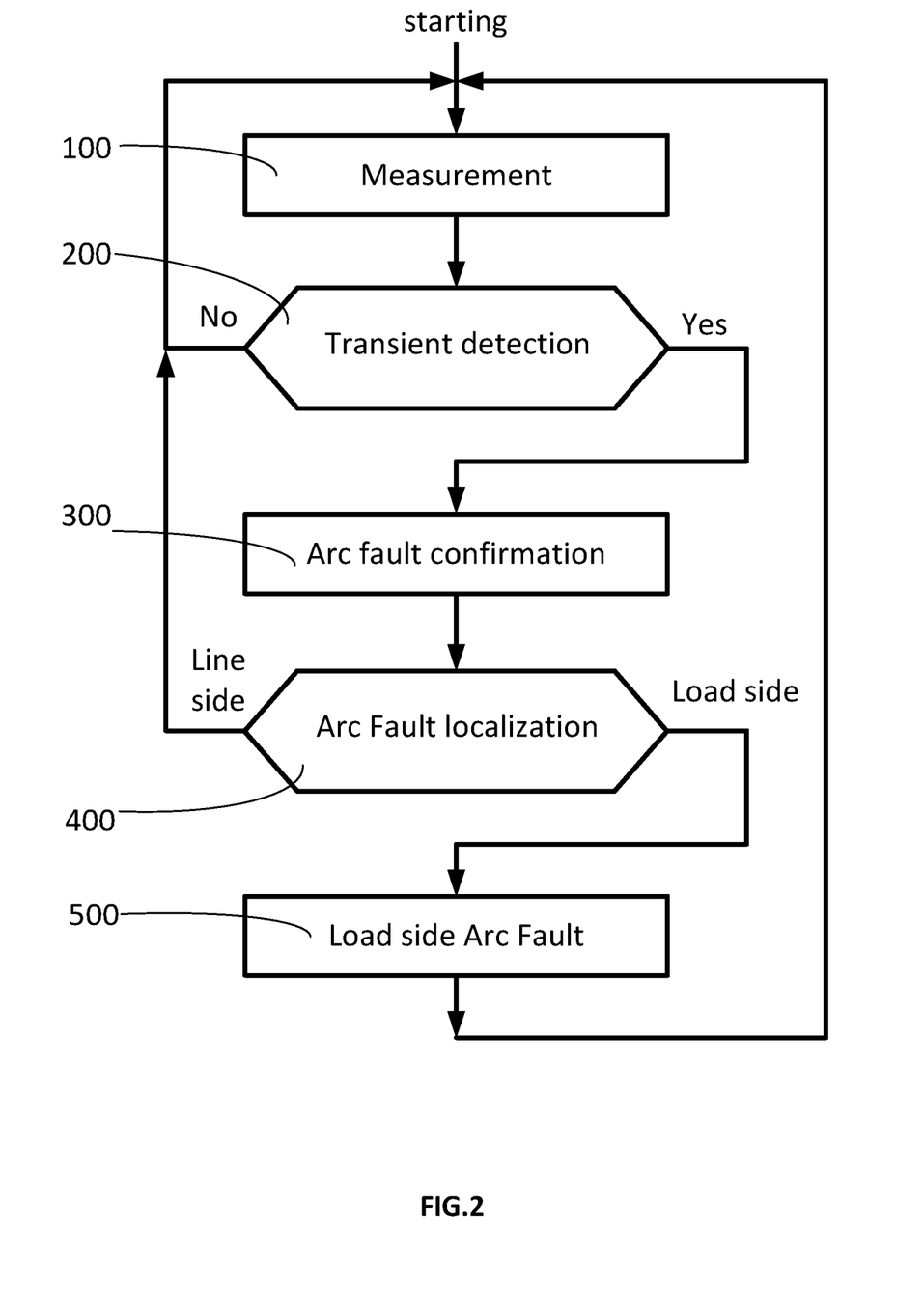
FIG. 2 shows a general flow diagram of a method allowing an arc fault to be located according to the invention.

FIG. 2 shows a general flow diagram of a method allowing an arc fault to be located according to the invention. The method is implemented by the first protection device 1 which allows an arc fault to be localized either upstream 52, or downstream 32 of said first protection device 1. A phase 100 comprises a measurement of several electrical quantities linked to the supply current I flowing in the second energy supply line 31. An electrical quantity consists of, for example, a current, a power, a load impedance, a power factor, a harmonic distortion rate, etc., said quantity being measured, for example, as an instantaneous value, as an average value, as an effective value, as a peak value. A measurement can include a calculation of drift or of integration over time of the electrical quantity. Finally, a measurement can be limited to a component of the electrical quantity situated within a predefined frequency band. Preferentially, the source 2 is a source delivering alternating electrical power of fundamental frequency F, for example 50 or 60 Hz and of fundamental period T, the period T being the inverse of the fundamental frequency F, T=1/F. A first quantity MES_AC_W is preferentially a measurement of the effective value of the supply current I computed over a first predefined period TS, in a low frequency band LFB, for example between a few hertz and a few hundreds of hertz. A second quantity MES_AC_A is preferentially a measurement of the effective value of the supply current I, in a low frequency band LFB, said effective value being averaged over several periods corresponding to the frequency F. A third electrical quantity MES_HF is preferentially a measurement of the effective value, over a third period TH, of the components of the supply current I situated in a high frequency band HFB. The high frequency band HFB preferentially corresponds to the frequencies lying between 1 MHz and 40 MHz. The computation of the third electrical quantity MES_HF can be performed on a demodulated HF broadband signal amplitude of the supply current I and said signal being compressed according to a nonlinear law.

An exit from the phase 100 of measurement of several electrical quantities is conditional on a detection of a simultaneous variation 200 of at least two electrical quantities linked to the supply current I. Preferentially, said two quantities are the first quantity MES_AC_W corresponding to a variation of the effective value of the supply current I and the third electrical quantity MES_HF. A simultaneous variation of the supply current and the appearance of high frequency components characterizes the presence of an arc fault downstream of the first protection device 1. An arc fault occurring on an energy supply line other than that being monitored will be manifested by a relative stability of the supply current I with the appearance of high frequency components by crosstalk effect. It may however be a transient arc fault or electromagnetic pollution linked to a switchover of the electrical load 3. To avoid any diagnostic error, the method switches to a phase 300 of confirmation of the presence of an arc fault. An exit from the phase 300 of confirmation of the presence of an arc fault is conditional on the differentiation 400 between a downstream arc fault 32 and an upstream arc fault 52. For that, when the third electrical quantity MES_HF is above a second predefined threshold TH_HF and when the deviation between a measurement of the second quantity MES_AC_A before and after fault is above a third predefined threshold TH_AC_A, these conditions having to be true for a predetermined duration, then the downstream arc fault is confirmed and the method switches to the downstream arc fault phase 500.

Figure 3:
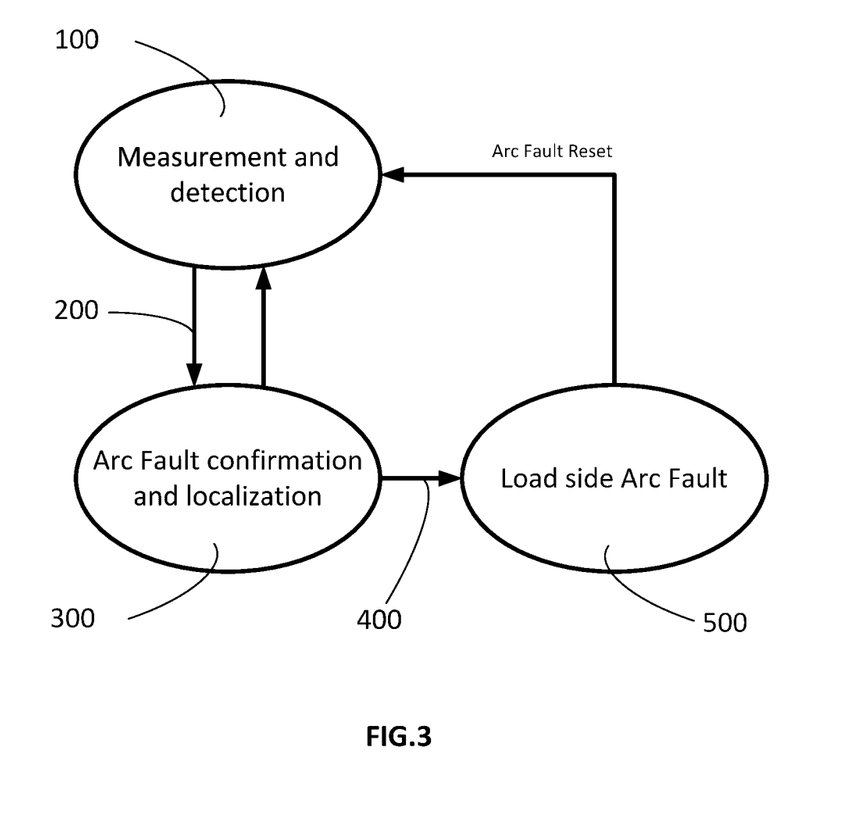
FIG. 3 is a state diagram representing the different phases of the arc fault location method and the transitions for switching from one phase to another phase.

The method for locating an arc fault is represented in FIG. 3 in the form of a state diagram representing the different phases of the method for locating an arc fault and the transitions for switching from one phase to another phase. In a first phase of measurement and of detection 100, the method comprises a measurement and a quantification of the electrical quantities linked to the supply current I to detect the appearance of disturbances of the supply current I. When the electrical quantities and their variations exceed predefined limits, the method switches to the identification and location phase 300 during which the method comprises the steps of confirmation of the existence of an arc fault and of localization of the fault upstream or downstream in relation to the position of measurement of the electrical quantities. If the progress of the method leads to the conclusion that it is an outlier, the method returns to the first measurement and detection phase 100. When the downstream arc fault is confirmed, the method switches to the confirmed downstream arc fault phase 500. The confirmation may lead to the opening of a switch to disconnect the failing portion of the electrical network. A reset is necessary to exit from the confirmed downstream arc fault phase 500 and return to the measurement and detection phase 100. This reset confirms that an operator has indeed taken account of the downstream arc fault presence information. The method represented in FIG. 3 is intended to be executed in sequence by a state machine, also called finite state machine. Each phase of the method corresponds to a state of the state machine.

Figure 4A:
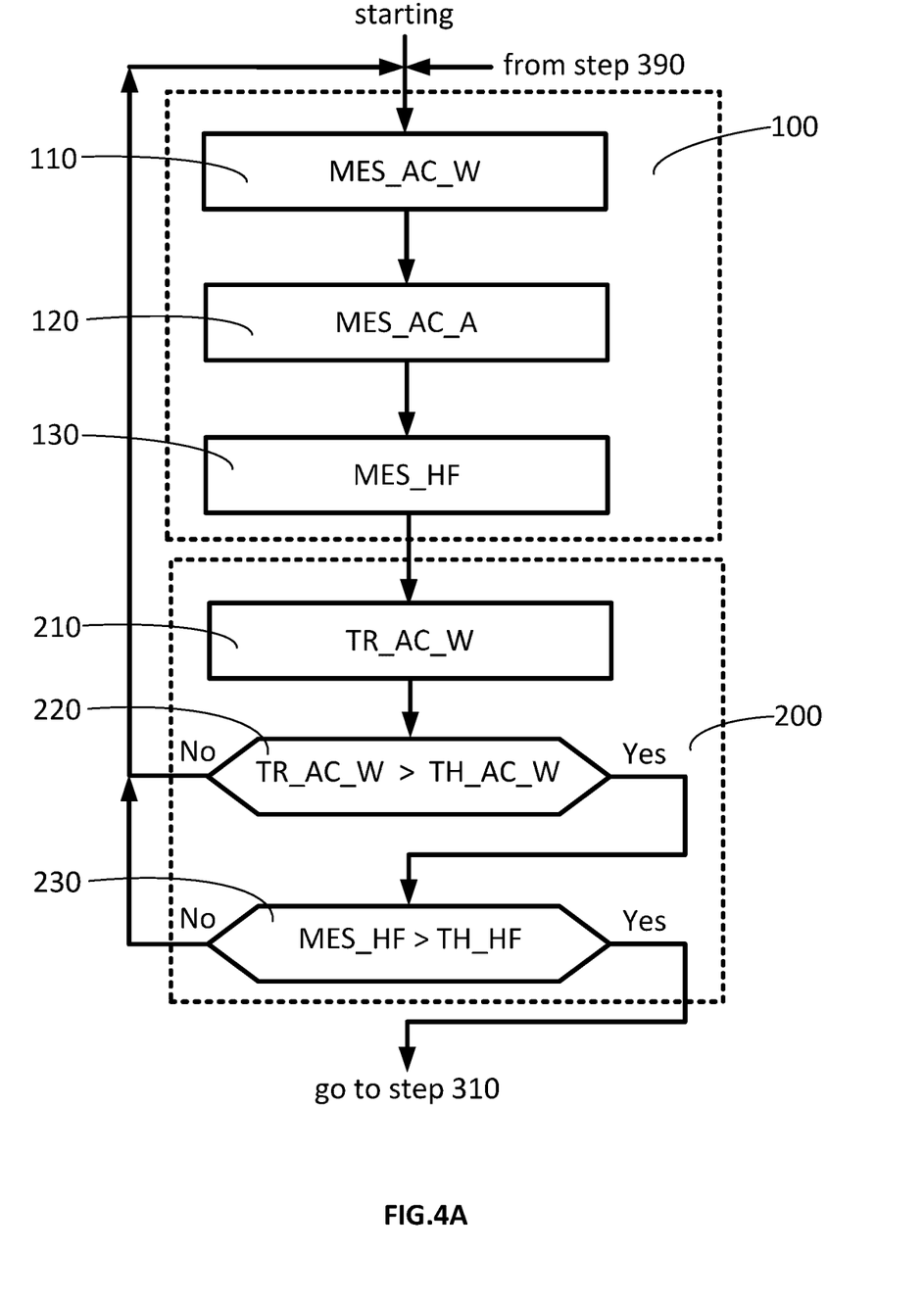
FIG. 4A shows a flow diagram for detailing the steps followed by the method when it is in a first phase and the conditions of transition to a second phase.

FIG. 4A shows a flow diagram for detailing the steps followed by the method when it is in the first measurement and detection phase 100. The step of measurement of electrical quantities linked to the supply current I is composed of a step 110 of measurement of the first quantity MES_AC_W. This first quantity is intended for the evaluation of an instantaneous value linked to the current flowing through the first load 3. Preferentially, said first quantity is a measurement of the effective value of the supply current I computed over a first period TS, in the low frequency band LFB. Other measurements can be adopted such as the measurement of the instantaneous value, the average value, the peak value, the variance or any other statistical descriptor, the harmonic distortion rate or even the measurement of the effective value of the drift of the supply current I or of the energy supply power. Preferentially, the first period TS lies between a half-fundamental period T and an entire fundamental period T. The low frequency band LFB comprises the fundamental frequency F. Preferentially, the low frequency band LFB corresponds to the interval lying between 50 Hz and 1000 Hz. The second quantity MES_AC_A is measured during the step 120. This second quantity is intended for the evaluation of the average current flowing through the first load 3. The second quantity is preferentially a measurement of the effective value of the supply current I over a second period TL preferentially greater than or equal to twice the first period TS. Said second quantity MES_AC_A is, for example, an effective value of the supply current I. Preferentially, to simplify the computation and reduce the memory space needed to store the successive measurements, the second quantity MES_AC_A is an exponential moving average of the measurement of the first electrical quantity MES_AC_W, that is to say that, at a given instant t:

$$MES\_AC\_A(t)=\alpha MES\_AC\_W(t)+(1-\alpha)MES\_AC\_A(t-Tcy)$$

MES_AC_A (t−Tcy) being the value of the second electrical quantity evaluated in the preceding cycle. α is a coefficient characterizing the degree of attenuation of the oldest measurements. The coefficient α lies between 0 and 1. The period of a measurement cycle Tcy lies between half of a fundamental period T and several periods T. Preferentially, Tcy is equal to a half-fundamental period T.

The third electrical quantity MES_HF is measured during the step 130. This third quantity is intended to identify the presence of an arc fault. It is preferentially a measurement of the effective value of a signal linked to the supply current I, in the high frequency band HFB, the measurement being performed over a third period TH greater than or equal to a half-fundamental period T. These high frequency components are linked to the current I since they are generated either directly by the downstream arc fault 32, or by crosstalk in the case of an upstream arc fault 52. These components do not generally participate in powering the first load 3.

The method continues with a check on conditions of transition from the first phase to the second phase. A computation of a first deviation TR_AC_W between two first electrical quantities MES_AC_W evaluated during two consecutive measurement cycles is executed during the step 210. The first deviation TR_AC_W is therefore calculated as follows:

$$TR\_AC\_W(t)=MES\_AC\_W(t)-MES\_AC\_W(t-Tcy)$$

that is to say that the value of the first deviation TR_AC_W, at an instant t, is the difference between the value of the first electrical quantity MES_AC_W measured at the instant t and the value of the first electrical quantity MES_AC_W measured in the preceding cycle t-Tcy.

The first deviation TR_AC_W is compared to a first predefined threshold TH_AC_W during a step 220. If the first deviation TR_AC_W is above the first predefined threshold TH_AC_W, then the method switches to the step 230 during which the third electrical quantity MES_HF is compared to a second predefined threshold TH_HF.

When the first deviation TR_AC_W is below the first threshold TH_AC_W or when the third electrical quantity MES_HF is below the second threshold (TH_HF), the method returns to the phase of measurement 100 of the electrical quantities. The method thus executes at least one cycle of measurement of the electrical quantities. When the first deviation TR_AC_W is above the first predefined threshold TH_AC_W and the third electrical quantity MES_HF is above the second predefined threshold TH_HF, then there is the presence of an arc fault downstream of the protection device executing the method and the method switches to the step 310 of the phase of confirmation of the presence of the arc fault.

A concomitant or simultaneous or joint variation of the first electrical quantity MES_AC_W and of the third electrical quantity MES_HF is defined as being a variation of the first electrical quantity MES_AC_W above the first predefined threshold TH_AC_W and a variation of the third electrical quantity MES_HF above the second predefined threshold TH_HF during one and the same measurement cycle or within a time interval less than or equal to a limited number of consecutive cycles, preferentially corresponding to six fundamental periods T i.e. a time interval of more or less 120 ms, the two events being able to appear in any order. A concomitant variation of the first electrical quantity MES_AC_W and of the third electrical quantity MES_HF reflects a variation of the supply current I combined with the appearance of high frequencies due to an electrical arc downstream of the electrical protection device 1. A first electrical arc 32 has the effect of generating micro-short-circuits or micro-disconnections on the second energy supply line 31, creating variations of the supply current I. On the other hand, a second electrical arc 52 can generate high frequency disturbances by crosstalk on the second energy supply line 31 but not disturb the supply current I. Thus, when one of the two preceding conditions is not met, the method returns to the measurement step 110.

Figure 4B:
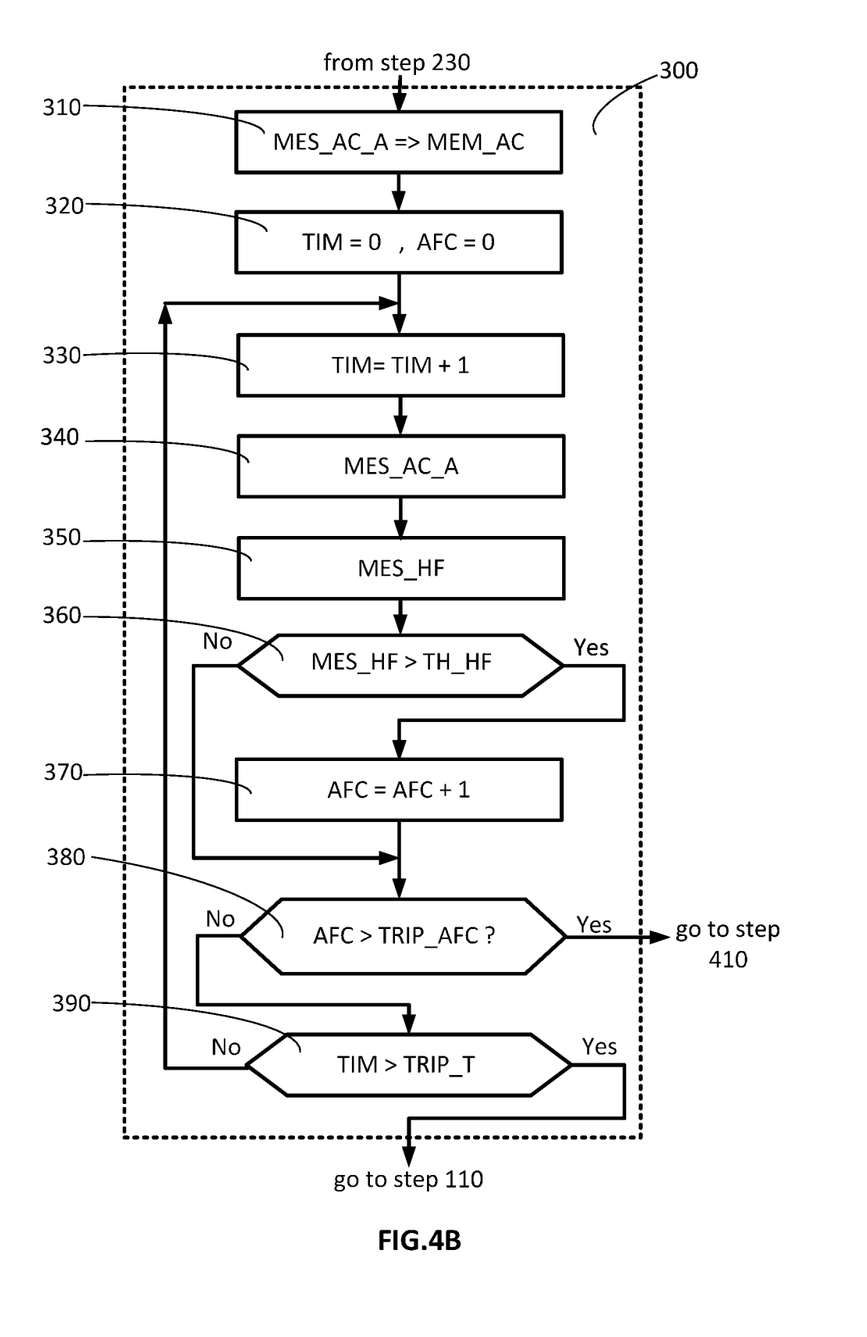
FIG. 4B shows a flow diagram for detailing the steps followed by the method when it is in a second phase.
Figure 4C:
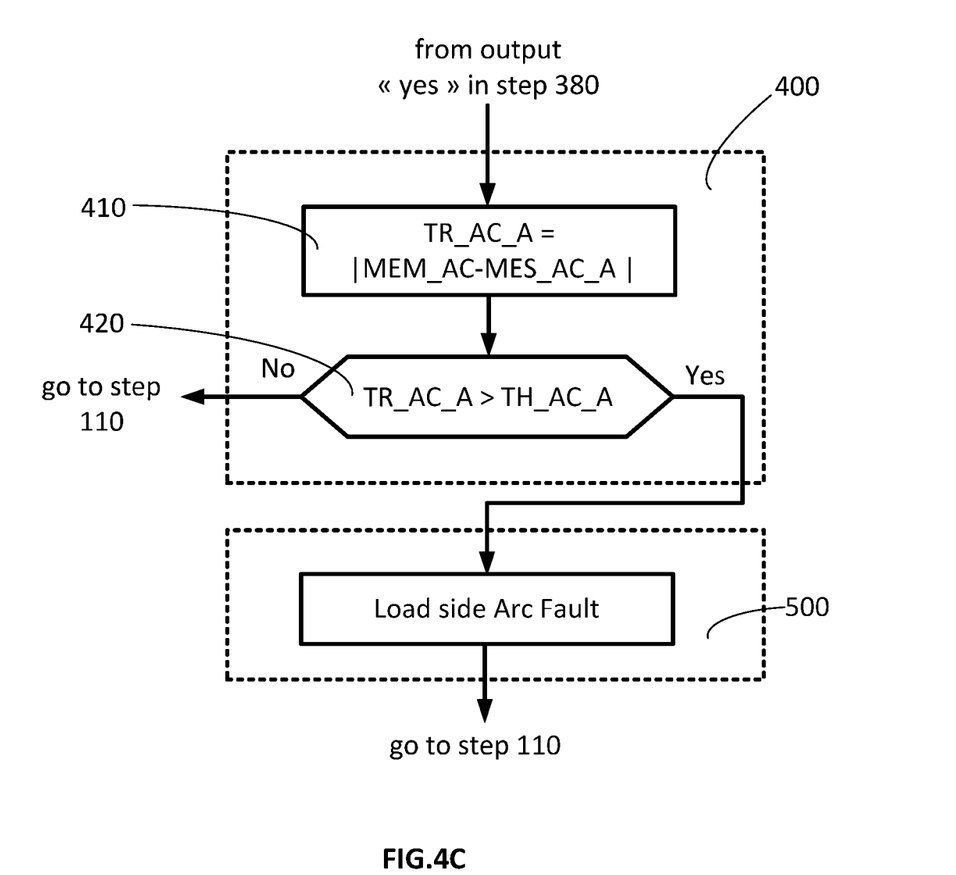
FIG. 4C shows a flow diagram for detailing the steps followed by the method to switch from the second phase to a third phase.

When a downstream arc fault is detected during the step 230, the method continues with a storage of the measurement of the second electrical quantity MES_AC_A in a memory MEM_AC during the step 310, as represented in FIG. 4B. The method continues to the step 320 with a reset of a time counter TIM and of an arc fault occurrence counter AFC (Arc Fault Counter). The time counter TIM is incremented during the step 330. A measurement of the second electrical quantity MES_AC_A is performed during the step 340 then a measurement of the third electrical quantity MES_HF is performed during the step 350. A comparison of the value of the third electrical quantity MES_HF to the second threshold TH_HF is performed in the step 360 and the arc fault occurrence counter AFC is incremented in the step 370 when the value of the third electrical quantity MES_HF is above the second threshold TH_HF. The method does not execute the step 370 when the value of the third electrical quantity MES_HF is below the second threshold TH_HF. In the step 380, the arc fault occurrence counter AFC is compared to a predefined occurrence threshold TRIP_AFC. When the arc fault occurrence counter AFC is below a predefined occurrence threshold TRIP_AFC, the method switches to the step 390 during which the time counter TIM is compared to a predefined duration TRIP_T. If the value of the time counter TIM is greater than the predefined duration TRIP_T, that is to say that the predefined duration TRIP_T has elapsed, knowing that the arc fault occurrence counter AFC has not reached the predefined occurrence threshold TRIP_AFC, then the method considers that the arc fault is not confirmed and the method returns to the step 110. If the value of the time counter TIM is less than the predefined duration TRIP_T, the method returns to the step 330 of incrementation of the time counter TIM. When, in the step 380, the arc fault occurrence counter AFC is above the predefined occurrence threshold TRIP_AFC, then the method switches to the step 410. In the step 410, as represented in FIG. 4C, an absolute value of a second deviation TR_AC_A between the value of the memory MEM_AC and the second electrical quantity MES_AC_A is calculated. Next, in the step 420, the method compares the value of the second deviation TR_AC_A to a predefined threshold TH_AC_A. If the second deviation TR_AC_A is below the predefined threshold TH_AC_A, that means that the second electrical quantity MES_AC_A has not varied significantly although there are high frequency signals measured by MES_HF present. It is not therefore a downstream arc fault, so the method returns to the first measurement and detection phase in the step 110. On the other hand, when the second deviation TR_AC_A is above the predefined threshold TH_AC_A, and the arc fault occurrence counter AFC is above the predefined occurrence threshold TRIP_AFC as tested in the step 380, then it is an arc fault situated downstream. The method switches to the third phase in the step 500. An information and/or correction and/or validation action is executed during the step 500 after which the method returns to the first measurement and detection phase in the step 110 to perform a new measurement cycle.

Figure 5A:
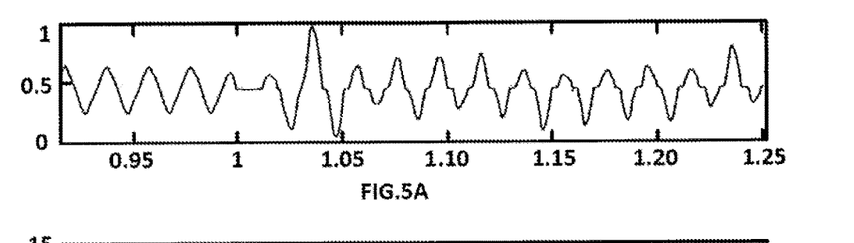
FIGS. 5A, 5B, 5C, 5D, 5E and 5F represent the trend over time of electrical quantities measured or calculated during the method in the case of an arc fault situated downstream of an arc detection device.
Figure 5B:
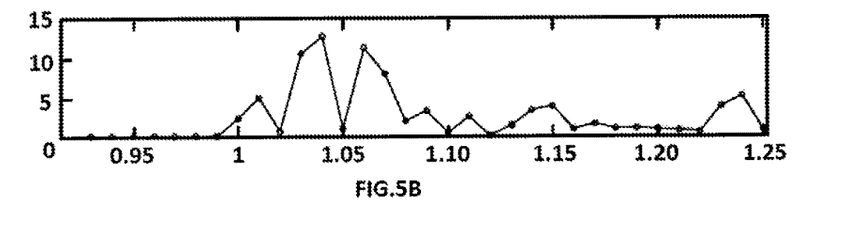
Figure 5C:
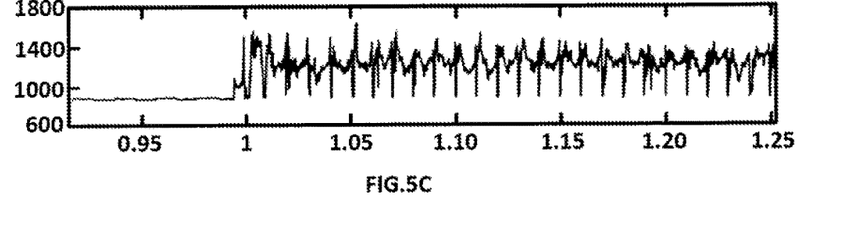
Figure 5D:
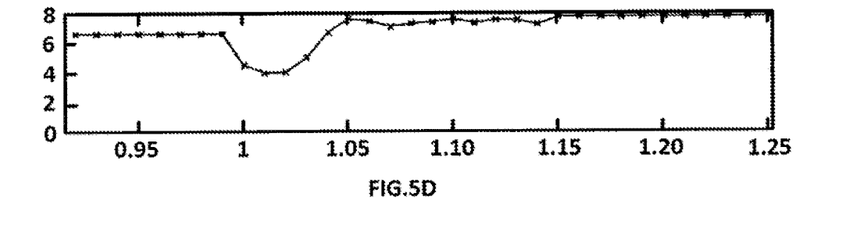
Figure 5E:
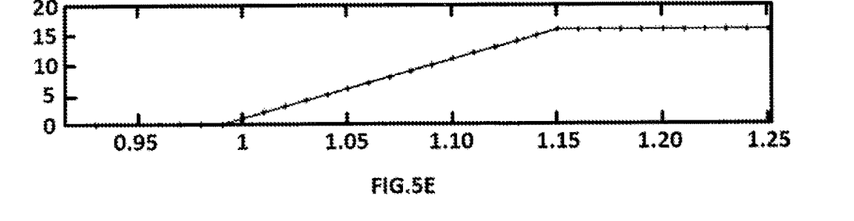

FIGS. 5A, 5B, 5C, 5D, 5E and 5F represent the trend over time of electrical quantities measured or calculated during the method in the case of an arc fault situated downstream of an arc detection device. The downstream arc fault occurs at the time t=1. Since the arc fault is situated downstream, the amplitude of the supply current I, represented in FIG. 5A, varies significantly. The first deviation TR_AC_W, represented in FIG. 5B, quantifies said variation. Concomitantly, high frequency components appear as represented in FIG. 5C. The method is in the conditions to switch to the second phase of confirmation and of localization. In FIG. 5D, the second quantity MES_AC_A is stored at the time t=1 in the memory MEM_AC then a new computation of the second quantity MES_AC_A is performed. FIG. 5E represents the incrementation of the arc fault occurrence counter AFC. Said counter AFC is incremented regularly from t=1 since the third electrical quantity MES_HF constantly exceeds the second threshold TH_HF as represented in FIG. 5C. When the time counter TIM has reached the predefined duration TRIP_T, at t=1.15, the method switches to the third phase in the confirmed downstream arc fault step 500 since:
- the time TIM is greater than the predefined duration TRIP_T,
- the arc fault occurrence counter AFC has exceeded the predefined occurrence threshold TRIP_AFC, and
- the second deviation TR_AC_A between the value of the memory MEM_AC and the second electrical quantity MES_AC_A is above the third predefined threshold TH_AC_A.

Figure 5F:
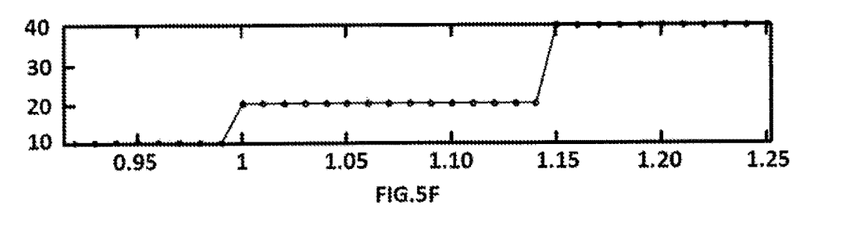

FIG. 5F represents the switching to the different phases: the first phase 100 before t=1, the second phase 300 between t=1 and t=1.15 and the third phase 400 for t>1.15.

Figure 6A:
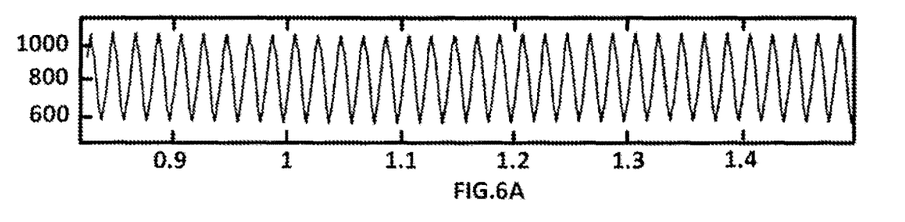
FIGS. 6A, 6B, 6C, 6D, 6E and 6F represent the trend over time of the electrical quantities measured or calculated during the method in the case of an arc fault situated upstream of the arc detection device.
Figure 6B:
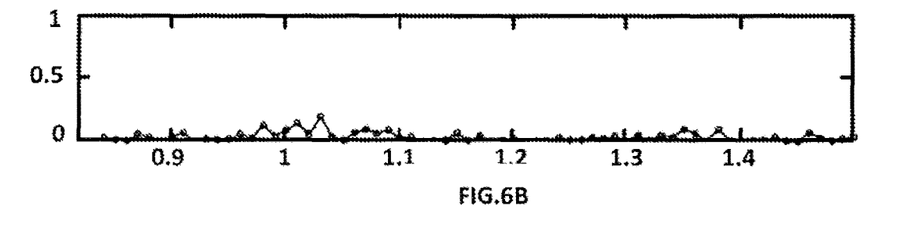
Figure 6C:
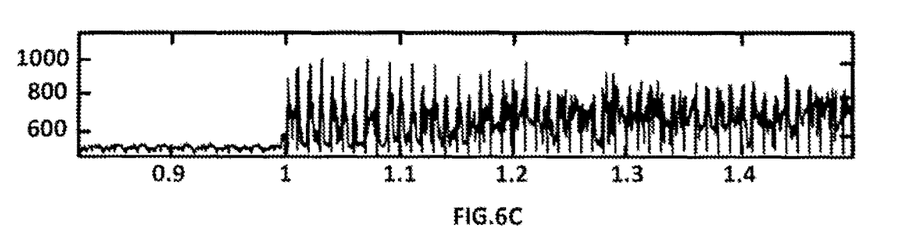
Figure 6D:
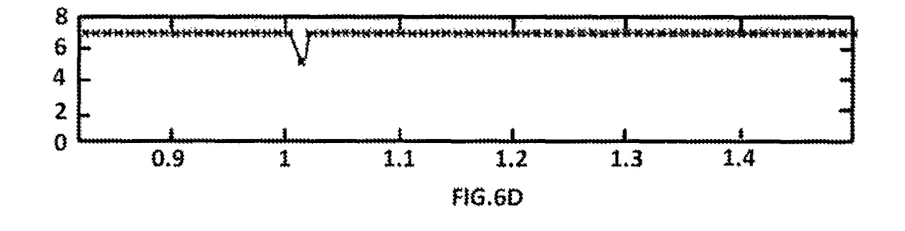
Figure 6E:
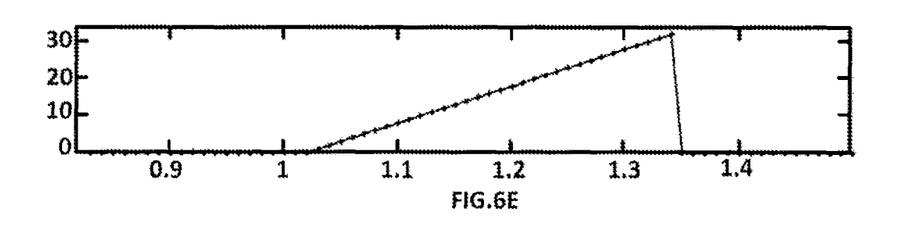
Figure 6F:
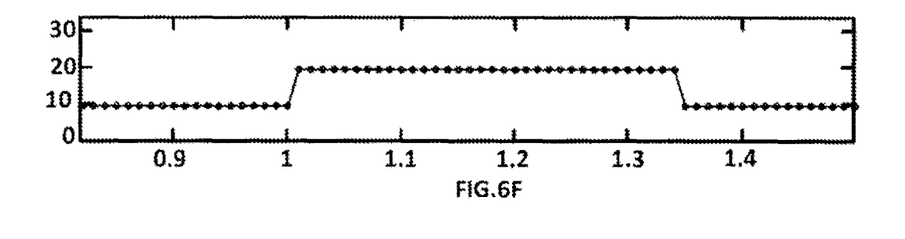

FIGS. 6A, 6B, 6C, 6D, 6E and 6F represent the trend over time of electrical quantities measured or computed during the method in the case of an arc fault situated upstream of an arc detection device. In this configuration, the amplitude of the supply current I, represented in FIG. 6A, varies very little. The first deviation TR_AC_W, represented in FIG. 6B, quantifies this small variation. However, simultaneously, high frequency components appear to be linked to a crosstalk phenomenon as represented in FIG. 6C. The method switches to the second phase of confirmation and localization. In FIG. 6D, the second quantity MES_AC_A is stored at the time t=1 in the memory MEM_AC then a new computation of the second quantity MES_AC_A is performed. FIG. 6E represents the incrementation of the arc fault occurrence counter AFC since the third electrical quantity MES_HF is above a second predefined threshold TH_HF. However, since the deviation between the second quantity MES_AC_A and the memory MEM_AC is below the third predefined threshold TH_AC_A, the method returns to the measurement phase 100. FIG. 6F represents the switching to the different phases: the first phase 100 before t=1, the second phase 300 between t=1 and t=1.34 and a return to the first phase t≥1.35.

The execution of the method is clocked by the period of a cycle Tcy lying between half of a fundamental period T and several periods T. Preferentially, the period of a cycle Tcy is equal to a half-fundamental period T in order for the method to be executed as rapidly as possible and detect an arc fault at the earliest possible time. The period of a cycle Tcy can also correspond to an entire fundamental period T. That corresponds to 1/120 second or 1/60 second for a fundamental frequency equal to 60 Hz.

Figure 7:
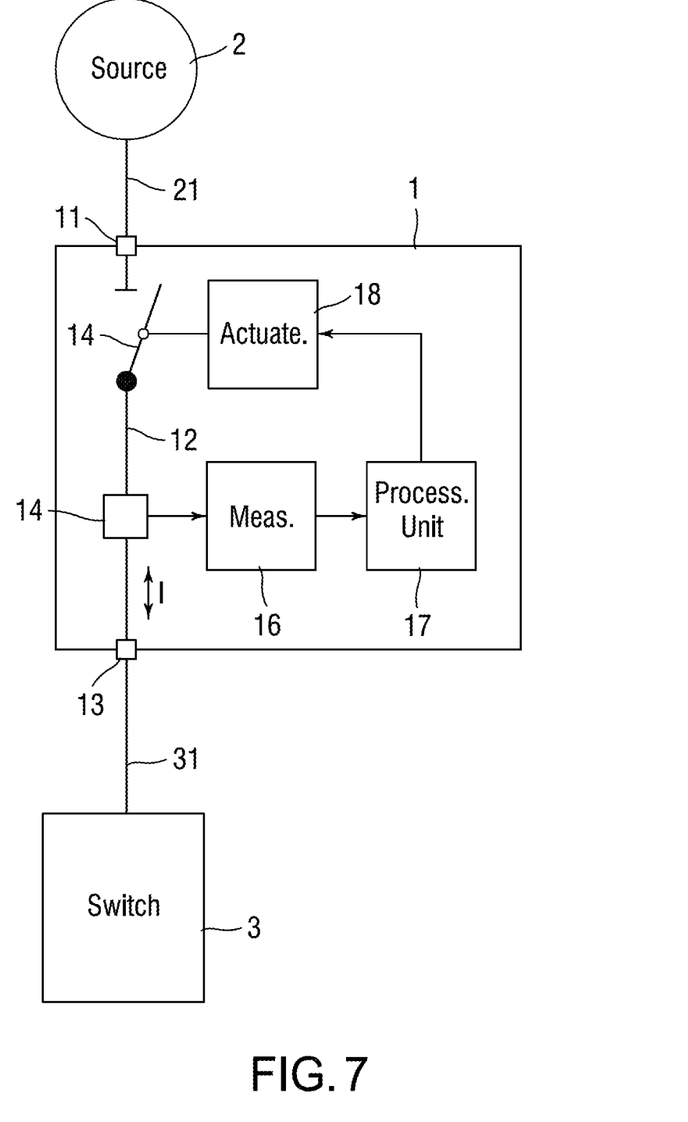
FIG. 7 represents a block diagram of an electrical protection device implementing the arc fault location method and capable of disconnecting electrical loads in the case of an arc fault situated downstream of the device.

The invention relates also to an electrical protection device 1 implementing the method described previously. FIG. 7 represents a block diagram of such a device, capable of disconnecting at least one electrical load 3 in the case of an arc fault situated downstream of said device. The protection device 1 of an electrical installation comprises:
- at least one upstream terminal 11 for connecting the protection device 1 to the electrical energy source 2 by means of a first current line 21,
- at least one downstream terminal 13 for connecting the device 1 to, at least, a first electrical load 3 by means of a second current line 31,
- at least one current switch 14 connected in series by means of at least one current conductor 12 between the upstream terminal 11 and the downstream terminal 13 to make or break the supply current I,
- an actuator 18 for actuating the current switch 14,
- at least one current sensor 15 arranged to supply a signal representative of the supply current I circulating in the current conductor 12, at least one measurement unit 16 connected to the current sensor 15 to measure the signal representative of the supply current I and supply the first, second and third electrical quantities linked to the supply current I, and a computation or processing unit 17 connected to the measurement unit 16 for receiving the electrical quantities linked to the supply current I and for implementing the arc fault detection method as described previously.

The processing unit 17 is preferentially arranged to implement the method by means of a state machine, each phase of the method corresponding to a state of the state machine.

The processing unit can be a microprocessor or microcontroller, a programmable logic circuit or a micro-state machine, this list not being exhaustive. The processing unit 17 is connected to the actuator 18. Preferentially, the processing unit executes the detection method and activates the actuator 18 in order to execute an opening of the current switch 14 when the downstream fault signaling step 500 is executed. Thus, an arc fault 32 detected and located downstream of the protection device 1 will be eliminated by the opening of the switch 14. The second current line 31 and the first load 3 will be powered down, the electrical arc 32 will not be able to cause problems. The arc location method described previously can also be executed in a second protection device 4. Said second device will eliminate an arc fault 52 situated downstream on the second electrical load 5 or on the third energy supply line 51 and, in this case, the first load 3 will remain powered up.

Such a method is particularly suitable for reliably detecting an arc fault situated downstream of a protection device and for rejecting the signals generated by crosstalk effect by an arc fault situated on another branch of an electrical energy supply network. Such a method is therefore of particular interest for use to avoid any untimely tripping of an electrical protection device in the presence of an arc fault in the installation.

The invention claimed is:

1. A method for locating an electrical arc fault upstream or downstream of an electrical protection device, said device being connected, upstream, to a first energy supply line linked to, at least, one electrical energy source and, downstream, to a second energy supply line linked to, at least, a first electrical load, the electrical energy source supplying a supply current to the first electrical load, said method comprising:
    measuring several electrical quantities linked to the supply current;
    confining a presence of the electrical arc fault;
    signaling the electrical arc fault downstream of the electrical protection device;
    first transitioning between the measurement of several electrical quantities and the confirmation of the presence of the electrical arc fault in response to a detection of a simultaneous variation of at least two of the several electrical quantities linked to the supply current; and
    second transitioning between the confirmation of the presence of the electrical arc fault and the signaling of a downstream arc fault in response to a determination of a position of the electrical arc fault downstream of the electrical protection device,
    wherein the measuring of several electrical quantities linked to the supply current further includes:
    measuring a first electrical quantity of the several electrical quantities linked to the supply current in a low frequency band and over a first period;
    measuring a second electrical quantity of the several electrical quantities linked to the supply current in the low frequency band and over a second period; and
    measuring a third electrical quantity of the several electrical quantities linked to the supply current in a high frequency band and over a third period.

2. The method as claimed in claim 1, wherein detection of a concomitant variation of at least two electrical quantities of the several electrical quantities includes:
    calculating a first deviation between two first electrical quantities of the several electrical quantities evaluated during two consecutive measurement cycles,
    comparing the first deviation to a first threshold, and
    comparing the measured third electrical quantity to a second threshold,
    wherein the first transitioning includes switching to the phase of confirmation of the presence of the electric arc fault when the first deviation is above the first threshold and when the third electrical quantity of the several electrical quantities is above the second threshold; and
    wherein the second transitioning includes returning to the phase of measurement of the electrical quantities for a new measurement cycle when the first deviation is below the first threshold or when the third electrical quantity of the several electrical quantities is below the second threshold.

3. The method as claimed in claim 2, wherein confirmation of the presence of the electric arc fault further includes:
    storing the measured second electrical quantity of the several electrical quantities in a memory;
    zero initializing of a time counter and of an arc fault occurrence counter;
    incrementing the time counter;
    measuring the second electrical quantity of the several electrical quantities; measuring the third electrical quantity of the several electrical quantities; comparing the value of the third electrical quantity of the several electrical quantities to the second threshold;
    incrementing the arc fault occurrence counter when the measurement of the third electrical quantity of the several electrical quantities is above the second threshold based on the second comparison;
    comparing the arc fault occurrence counter to a predefined occurrence threshold;
    comparing the time counter to a predefined duration; and
    switching to the step of determining the position of the electric arc fault when the arc fault occurrence counter is above the predefined occurrence threshold.

4. The method as claimed in claim 3, wherein the determination of the position of the arc fault further includes:
    computing an absolute value of a second deviation between the value of the memory and the second electrical quantity of the several electrical quantities;
    comparing the value of the second deviation to a third threshold; and
    switching to the downstream arc fault signaling phase when the value of the second deviation is above the third threshold.

5. The method as claimed in claim 1, wherein measuring the second electrical quantity is an exponential moving average of the measured first electrical quantity.

6. The method as claimed in claim 1, wherein the electrical energy source delivers an alternating current having a fundamental period and the first period lies between a half-fundamental period and a fundamental period.

7. The method as claimed in claim 1, wherein the second period is greater than or equal to twice the first period.

8. The method as claimed in claim 1, wherein the measured first electrical quantity is the effective value of the supply current.

9. The method as claimed in claim 1, wherein the high frequency band comprises the frequencies lying between 1 MHz and 40 MHz.

10. The protection device as claimed in claim 1, wherein the detection of the simultaneous variation of at least two electrical quantities of the several electrical quantities includes:
calculating a first deviation between two first electrical quantities of the several electrical quantities, and
comparing the first deviation to a threshold.

11. A protection device of an electrical installation comprising:
at least one upstream terminal for connecting the device to an electrical energy source with a first current line;
at least one downstream terminal for connecting the device to an electrical load with a second current line;
at least one current switch connected in series with at least one current conductor between the upstream terminal and the downstream terminal for breaking or allowing the passage of the supply current;
an actuator for actuating the current switch;
at least one current sensor arranged to supply a signal representative of the supply current flowing through the current conductor; and
measurement circuitry connected to the current sensor to measure the signal representative of the supply current and other electrical quantities linked to the supply current; and
processing circuitry connected to the measurement circuitry and configured to
receive the electrical quantities linked to the supply current;
measure several electrical quantities linked to the supply current, wherein the several electrical quantities include the signal representative of the supply current and other electrical quantities linked to the supply current;
confirm a presence of an electrical arc fault based on the measured several electrical quantities linked to the supply current;
signal the electrical arc fault downstream of the electrical protection device;
transition between the measurement of several electrical quantities and the confirmation of the presence of the electrical arc fault in response to a detection of a simultaneous variation of at least two of the electrical quantities of the several electrical quantities linked to the supply current; and
transition between the confirmation of the presence of the electrical arc fault and the signaling of a downstream arc fault in response to a determination of a position of the electrical arc fault downstream of the electrical protection device,
wherein the measuring of several electrical quantities linked to the supply current further includes:
measuring a first electrical quantity of the several electrical quantities linked to the supply current in a low frequency band and over a first period;
measuring a second electrical quantity of the several electrical quantities linked to the supply current in the low frequency band and over a second period; and
measuring a third electrical quantity of the several electrical quantities linked to the supply current in a high frequency band and over a third period.

12. The protection device as claimed in claim 11, wherein the processing circuitry is connected to the actuator to activate said actuator in order to open the current switch when the processing circuitry signals the electric arc fault downstream of the electrical protection device.

13. The protection device as claimed in claim 11, wherein the processing circuitry implements a state machine, and wherein each phase corresponds to a state of the state machine.

14. A method for locating an electrical arc fault upstream or downstream of an electrical protection device, said device being connected, upstream, to a first energy supply line linked to, at least, one electrical energy source and, downstream, to a second energy supply line linked to, at least, a first electrical load, the electrical energy source supplying a supply current to the first electrical load, said method comprising:
measuring several electrical quantities linked to the supply current;
confirming a presence of the electrical arc fault;
signaling the electrical arc fault downstream of the electrical protection device;
transitioning between the measurement of several electrical quantities and the confirmation of the presence of the electrical arc fault in response to a detection of a simultaneous variation of at least two of the several electrical quantities linked to the supply current; and
transitioning between the confirmation of the presence of the electrical arc fault and the signaling of a downstream arc fault in response to a determination of a position of the electrical arc fault downstream of the electrical protection device,
wherein the measuring of several electrical quantities linked to the supply current further includes:
measuring a first electrical quantity of the several electrical quantities linked to the supply current in a low frequency band and over a first period,
measuring a second electrical quantity of the several electrical quantities linked to the supply current in the low frequency band and over a second period, and
measuring a third electrical quantity of the several electrical quantities linked to the supply current in a high frequency band and over a third period, and
wherein detection of a concomitant variation of at least two electrical quantities of the several electrical quantities includes:
calculating a first deviation between two first electrical quantities of the several electrical quantities evaluated during two consecutive measurement cycles,
comparing the first deviation to a first threshold,
comparing the measured third electrical quantity to a second threshold,
switching to the phase of confirmation of the presence of the electric arc fault when the first deviation is above the first threshold and when the third electrical quantity of the several electrical quantities is above the second threshold, and
returning to the phase of measurement of the electrical quantities for a new measurement cycle when the first deviation is below the first threshold or when the third electrical quantity of the several electrical quantities is below the second threshold.

15. The protection device as claimed in claim 10, wherein the calculating of the first deviation between two first electrical quantities of the several electrical quantities is evaluated during two consecutive measurement cycles.

* * * * *